L. BIAVA.
TRANSMISSION GEAR FOR MOTOR VEHICLES.
APPLICATION FILED AUG. 31, 1915.

1,194,591.

Patented Aug. 15, 1916
5 SHEETS—SHEET 1.

WITNESSES:

INVENTOR:
Louis Biava,
BY
Charles C. Gill
ATTORNEY.

L. BIAVA.
TRANSMISSION GEAR FOR MOTOR VEHICLES.
APPLICATION FILED AUG. 31, 1915.

1,194,591.

Patented Aug. 15, 1916.
5 SHEETS—SHEET 5.

WITNESSES:

INVENTOR:
Louis Biava
BY
Charles C. Gill,
ATTORNEY.

UNITED STATES PATENT OFFICE.

LOUIS BIAVA, OF WEST HOBOKEN, NEW JERSEY.

TRANSMISSION-GEAR FOR MOTOR-VEHICLES.

1,194,591. Specification of Letters Patent. Patented Aug. 15, 1916.

Application filed August 31, 1915. Serial No. 48,184.

*To all whom it may concern:*

Be it known that I, LOUIS BIAVA, a citizen of the United States, and a resident of West Hoboken, in the county of Hudson and State of New Jersey, have invented certain new and useful Improvements in Transmission-Gear for Motor-Vehicles, of which the following is a specification.

The invention pertains more particularly to transmission gearing intended, among other purposes, for use on automobiles and other motor vehicles.

One object of the invention is to provide automatic mechanism, under the control of the operator, for shifting the gearing, said means being set to shift the gearing when released so to do by the operator, by the speed of the vehicle.

Another object of the invention is therefore to eliminate the necessity of shifting the gear mechanism by hand, leaving the hands and mind of the operator free to be used in steering and the other requirements of a motor vehicle. I utilize the speed of the vehicle in setting certain mechanism which, when released by the operator, will automatically effect the shifting of the gearing so as to vary the speed of the vehicle.

The mechanism of my invention comprises a gear-box in which the gears for securing varying speeds from first speed to high speed are confined in a drum adjacent to said box containing mechanism adapted for actuation by centrifugal force arising from the speed of the vehicle for automatically storing up power to be used, when released to act, for effecting the movement of an intermediate rod or shaft connected with the gearing and adapted when moved to shift said gearing for changing the speed of the vehicle. In the preferred construction I connect a rod or shaft extending into the gear box with certain movable bars or elements within the aforesaid drum adapted to effect the longitudinal movement of said rod or shaft in either direction and provide within said drum oppositely slidable weights or blocks which, during the travel of the vehicle and due to centrifugal action imposed thereby on said weights or blocks, will move outwardly in opposite directions and compress springs against said bars or elements, then held stationary, and thereby create a stored up power in said springs which is utilized upon the release of said bars or elements by the operator to actuate said shifting rod or shaft in one direction to vary the speed. On the slowing down of the vehicle, said weights or blocks will move inwardly or in a direction toward each other and again store up power by compressing certain other springs which, when released so to do, will through said bars or elements, move said rod or shaft in a reverse direction for changing the speed of the vehicle on a downward ratio. The release of the bars or elements acted upon by said springs will be effected from a foot treadle, and said bars and springs represent power means or spring motors, variable in action in accordance with the speed of the vehicle, for shifting the transmission gearing to secure either a higher speed or a lower speed than that at which the vehicle is traveling. In carrying out my invention I therefore combine with the transmission gearing shiftable to vary the speed, power means adapted to be set by the speed of the vehicle for shifting the gearing to vary the speed and means under the control of the operator for releasing said power means to act.

The invention will be fully understood from the detailed description hereinafter presented, reference being had to the accompanying drawings, in which.

In the drawings 15 designates a portion of the usual engine shaft, 16 a clutch member connected therewith, 17 a portion of the customary shaft for driving the rear axle of the vehicle, 18 an auxiliary shaft having on one end a cone clutch member 19 to engage the aforesaid clutch member 16 at the proper time, 20 a spring on said auxiliary shaft having a normal tendency to keep the aforesaid clutch members in engagement with each other, 21 a gear box, 22 a shaft extending into said box and being hollow throughout a portion of its length, as hereinafter explained, 23 a coupling member rigid with the shaft 22 and receiving a key-shaped head on the rear end of the auxiliary shaft 18 whereby motion may be communicated from said shaft 18 to the shaft 22 and parts connected therewith, 24 a rotary drum to which the shaft 17 is knuckled and which contains governing and controlling mechanism for the transmission gears, 25 a plate connected with said drum and adapted to have a slidable movement on a hub 26 toward and from said drum, 27 a hub formed on the plate 25 and containing a groove (Fig. 3) within which is placed a yoke 28 of inverted U-shape, 29 a yoke or frame hinged at its lower end to a fixed bracket 30 and controlling and being pivoted, as at 31, to the yoke 28, 32 a foot lever fulcrumed at 33 and at its lower closed end pivotally engaging a ring 34 located in a groove in the hub 35 of the clutch member 19, 36 a connecting rod pivotally secured at its front end to the lever 32 above the fulcrum thereof and at its rear end being provided with a fixed fork 37, whose opposite sides are formed with slots, as at 38, and 39 a rod connected at its front end by a pin 40 with the fork or rod end 37 and having at its rear end a recessed member 41 engaging and hooking upon a wrist 42 at the upper end of the hinged frame 29. The slots 38 in the fork or rod end 37 normally extend rearwardly of the pin 40 so that the foot lever 32 may be moved forwardly to a limited extent before the rod 36 connected therewith affects, through the pin 40, the rod 39. When the foot lever 32 is pressed forwardly until the rear ends of the slots 38 engage and act against the pin 40, the rod 39 will be pulled forwardly by the rod 36 and said rod 39 will then turn the upper end of the frame 29 forwardly with the result of pulling or sliding the plate 25 forwardly on the hub 26 of the drum 24, this movement of said plate 25 having the effect in the mechanism within the drum 24 hereinafter explained. The rod 39 is guided in its movement between plates 43 secured on the top of the gear box 21 and said plates 43 are slotted, as at 44, to receive pins 45 fastened to said rod 39 (Figs. 9 and 10) and to support said rod and permit the same to have a sliding movement. A spring 46 is connected to the rod 39 and its purpose is to normally draw the rod 39 rearwardly when the frame 29, after having been pulled forwardly, turns rearwardly.

The forward end of the shaft 18 is secured by a pin 47 to the hub of the clutch member 19, and said pin passes through a slot 48 in the shaft 18, whereby without disconnecting the clutch member 19 from the shaft 18, said clutch member may be adjusted toward and from the clutch member 16, as usual.

Figures 1, 2:
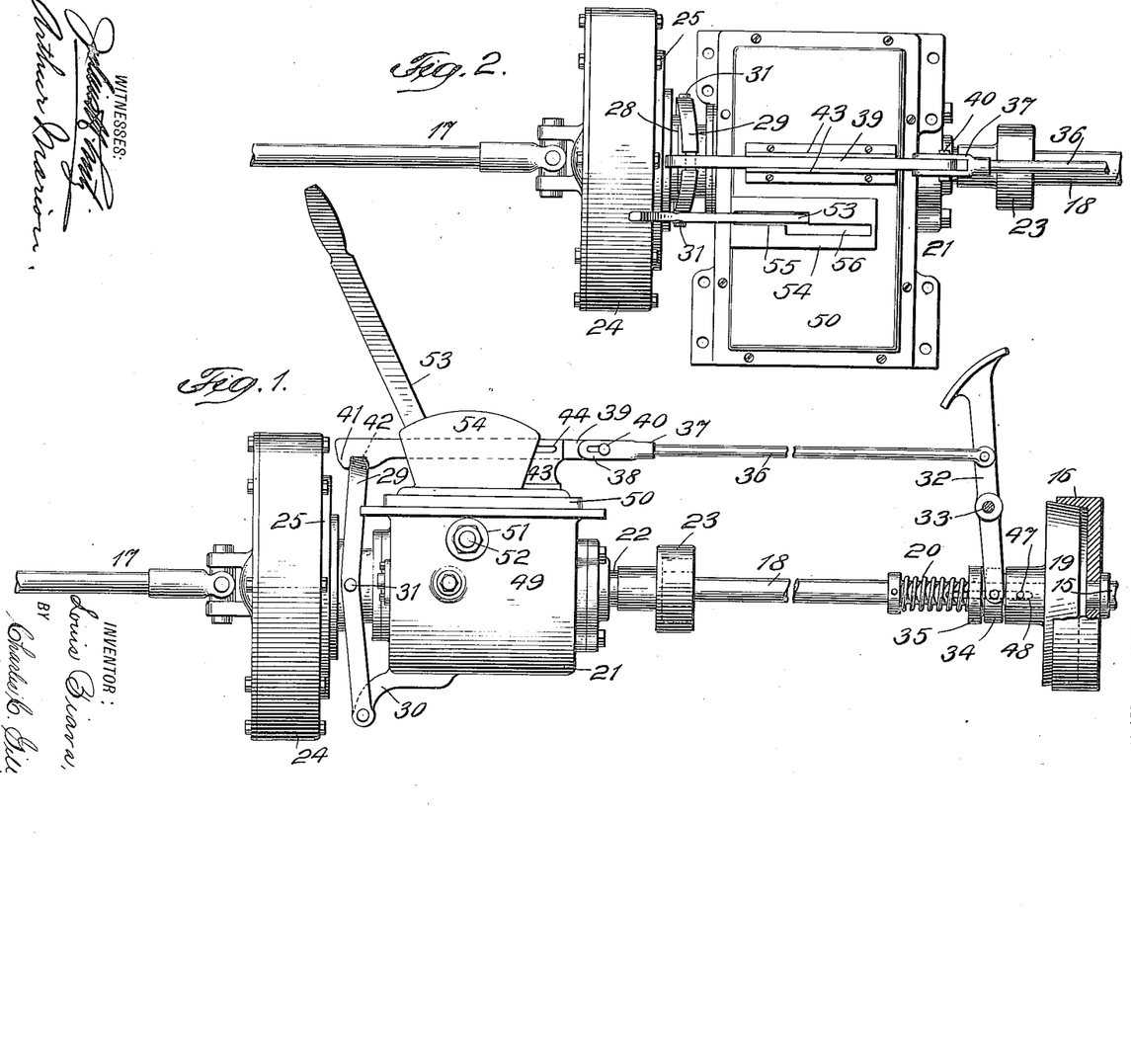
Figure 1 is a side elevation, partly broken away and partly in section, of transmission gear apparatus embodying my invention, a portion of the driving shaft from the engine with its clutch member and a portion of the shaft leading to the rear axle being illustrated.
Fig. 2 is a top view of a portion of the same.
Figure 9:
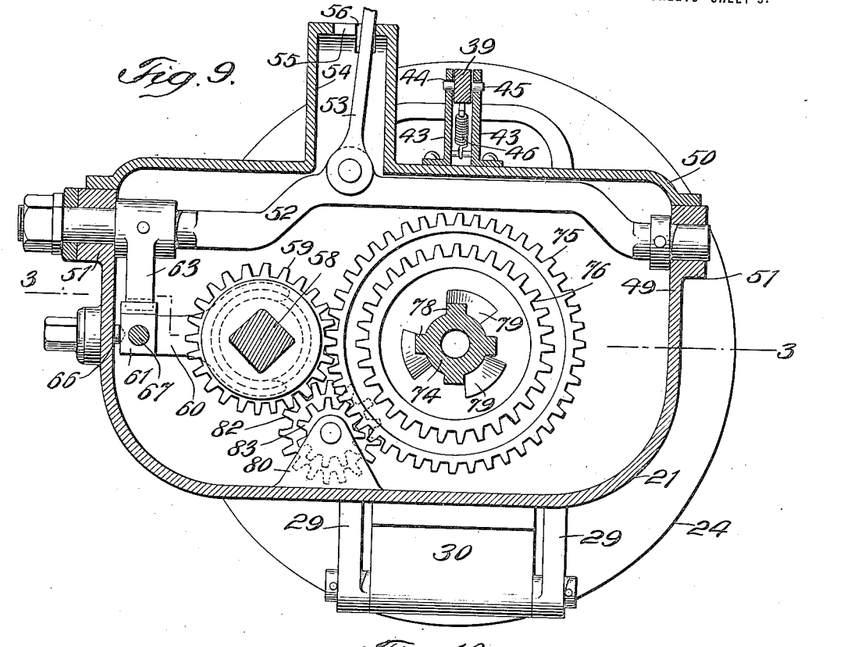
Fig. 9 is a vertical transverse section, partly broken away, through the gear box and mechanism therein, the section being taken on the dotted line 9—9 of Fig. 3.
Figure 10:
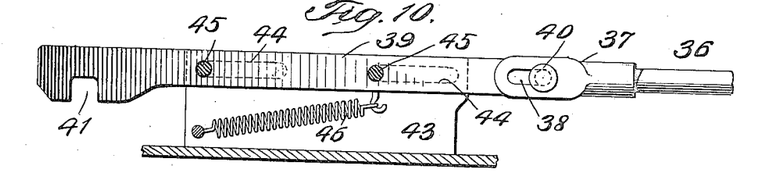
Fig. 10 is a detached view, partly broken away and partly in section, of a portion of the mechanism, Fig. 10 showing more particularly a portion of the connecting rod by which, from the foot-treadle a portion of the mechanism may be moved.

The form of the gear box 21 is clearly illustrated in Figs. 1, 2, 3 and 9 and comprises a body portion 49 and a top 50 detachably fastened thereon, said body portion having cast on its bottom the bracket 30 for the frame 29 and on its sides bearing hubs 51 for the transverse rock-arm 52 which is adapted to be manually actuated by means of a handle or lever 53 which extends upwardly through the box 54 cast on the cover 50 and having slots 55, 56 connected together at their inner ends but offset from each other, as shown in Fig. 2, and in either of which slots the handle or lever 53 may be placed, when actuated to turn the rock arm 52 and parts connected therewith for the purpose hereinafter described, the sides of the slots 55, 56 serving to retain the handle or lever 53 against lateral movement after said handle has been set in the desired position. The handle or lever 53 is pivotally connected with the rock arm 52, as shown in Fig. 9, and hence said arm when at the juncture of the slots 55, 56 may be moved laterally from one to the other slot. It may also be then thrown longitudinally to lie between the side edges or walls of the slot in which it may be placed.

Within the gear box 21 is mounted, preferably on ball bearings, a shaft 57, one portion 58 of which is polygonal in cross-section and has mounted thereon a slidable gear wheel 59, said gear wheel being slidable by means of a fork 60 formed integral with a slide 61 geared to a crank arm 63 secured on the aforesaid rock-arm 52. The lower end of the crank arm 63 is formed with gear teeth adapted to the teeth 64 formed in the upper surface of the slide 61. The slide 61 is formed in its outer edge with a series of recesses 65 adapted to receive the conical point of a spring-pressed pin 66, said pin and recesses 65 serving to yieldingly lock the slide 61 in any position to which it may be shifted by means of the arm 63 when the latter is actuated from the handle or lever 53 and rock-arm 52. The slide 61 is mounted on a rod 67 held at one end in a fixed lug 68 and at its other or rear end being mounted in a hole in the gear box 21. The polygonal form of the portion 58 of the shaft 57 serves to key the gear wheel 59 upon the shaft while at the same time allowing said gear wheel to be shifted on said shaft. The purpose of shifting the gear wheel 59 will appear hereinafter. Upon the forward end of the shaft 57 is secured a gear wheel 69, and somewhat adjacent to said gear wheel 69 there is secured upon the shaft 57 a gear wheel 70 which is less in diameter than the gear wheel 69 and greater in diameter than the gear wheel 59.

Figure 3:
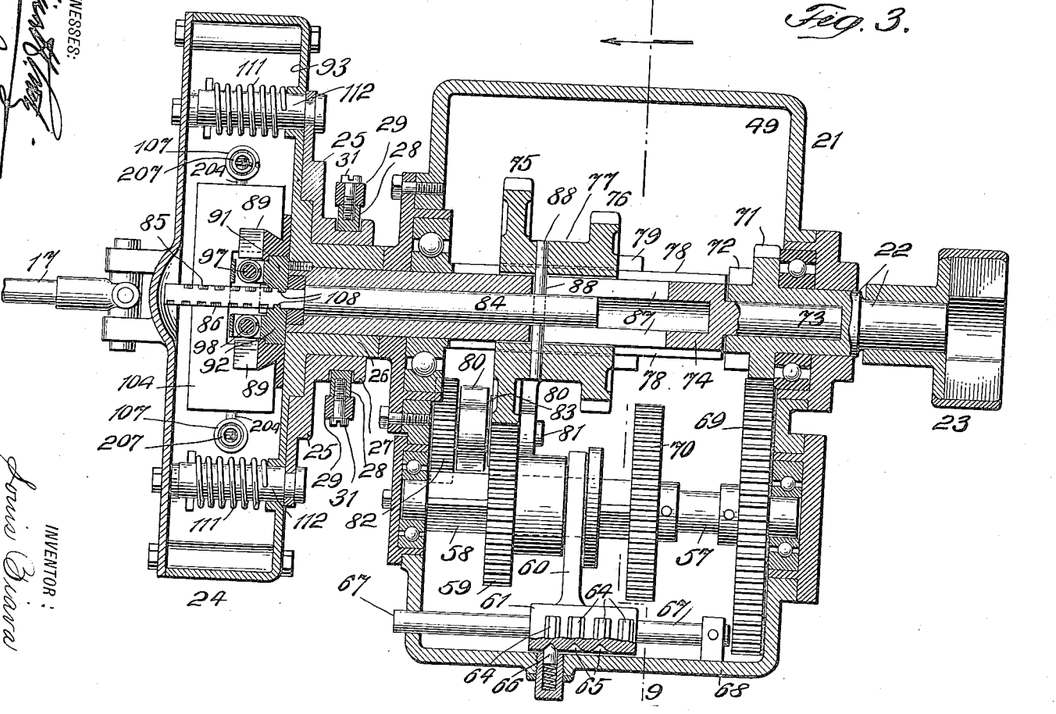
Fig. 3 is a transverse section through the transmission gear apparatus embodying my invention, the section being taken on the dotted line 3—3 of Fig. 9.

The shaft 22 is mounted in the forward end of the box 21, as shown in Fig. 3, and has formed on it a pinion wheel 71 which is in constant mesh with the gear wheel 69 on the shaft 57, and said shaft 22 is also formed integrally with a clutch member 72. The shaft 22 is hollow throughout a portion of its length or contains a socket, as shown in Fig. 3, to receive the reduced end 73 of a shaft 74 which is hollow throughout the greater portion of its length and extends rearwardly through the box 21. Upon the shaft 74 is mounted two connected together gear wheels 75, 76, respectively, said gear wheels being connected by a hub 77 and slidably on the shaft 74, which is provided with keys or splines 78 by means of which said gear wheels 75, 76 become keyed to the shaft 74 and at the same time are slidable thereon. The gear wheel 75 may be placed in mesh with the gear wheel 59, as shown in Fig. 3, and by shifting the gear wheels 75, 76 the gear wheel 76 may be placed in mesh with the gear wheel 70 and the gear wheel 75 withdrawn from engagement with the gear wheel 59. Upon the forward face of the gear wheel 76 is formed a clutch member 79 which may, when desired, and on the shifting of the hub 77, be moved into engagement with the clutch member 72 on the shaft 22, at which time the shaft 74 will be driven at engine speed or directly from the engine in lieu of through intermediate gearing.

Upon the bottom of the box 21 there are cast suitable lugs 80 in which is mounted a shaft 81 upon which are secured gear wheels 82, 83. The gear wheels 82, 83 may be connected together by a hub corresponding with the hub 77 connecting the gear wheels 75, 76, if desired, and as shown in Fig. 9 the gear wheel 83 is less in diameter than the gear wheel 82. When the parts are in the relative position shown in Fig. 3 the gear wheel 83 is in mesh with the gear wheel 75 and will be rotated by it and impart corresponding movement to the gear wheel 82, but at such time said gear wheels 83, 82 perform no function. The gear wheels 82, 83 only come into use when it is desired to reverse the vehicle in motion and then said gear wheels become effective from the fact that the operator will, by means of the handle 53, rock the arm 52 in a proper direction and to a sufficient extent to cause the crank or segment 63, by engaging the slide or rack 61, to shift the gear wheel 59 into mesh with the gear wheel 82, said gear wheel 59 during this shifting leaving its engagement with the gear wheel 75. The movement of the handle or lever 53 to effect the shifting of the gear wheel 59 into mesh with the gear wheel 82, will be from the position in which said handle is shown in Figs. 1 and 2 in the slot 55 to the opening connecting the inner ends of said slots and then laterally into the slot 56 and forwardly to the front end of said slot 56, said handle then having a position reverse to that illustrated in Fig. 1. When, therefore, the handle or lever 53 is in the position shown in Fig. 1, the gearing will be in the position shown in Fig. 3 or at the first speed, and when the lever 53 is moved to the forward end of the slot 56, the gear wheel 59 will move into mesh with the gear wheel 82 for reversing the drive leading to the rear axle of the vehicle. The handle or lever 53 must be returned to the slot 55 when the vehicle is to go forward. When the handle or lever 53 is moved to an intermediate position, that is either to the front end of the slot 55 or rear end of the slot 56, the gear wheel 59 will thereby be shifted to stand between the planes of the gear wheels 75, 82 without engaging either of said gear wheels, and at this time and under this condition, the engine may be in motion but no motion will be communicated to the shaft 74. The offsetting of the slots 55, 56 at their adjoining ends, affords convenient shoulders for arresting the handle or lever 53 when the same is moved to its intermediate or neutral position. I provide the slide or rack 61 with three recesses 65 so that the spring-pressed pin or stud 66 may, when in the rear recess 65, releasably retain the gear wheel 59 in proper engagement with the gear wheel 75; when the handle or lever 53 is moved to a neutral position to shift the gear wheel 59 into a plane intermediate the gear wheels 75, 82, the middle notch or recess 65 in the slide or rack 61 will be engaged by the spring-pressed stud or pin 66 and said gear wheel 59 will thereby be releasably held in its neutral position with the vehicle stationary; and when the handle or lever 53 is moved to its extreme forward position to carry the gear wheel 59 into mesh with the gear wheel 82 so as to effect the reversal of the driving motion as applied to the rear axle of the vehicle, the stud or pin 66 will engage the forward recess 65 of the slide 61 and releasably retain the gear wheel 59 in its position engaging the gear wheel 82. In the construction presented in the drawings the gear wheel 59 may thus be given any of three positions, the first position, shown in Fig. 3, being for attaining the first speed, the second position for cutting off power from the rear axle of the vehicle, and the third position for effecting the reversal of movement of the vehicle.

The gear wheels 75, 76 are slidable on the ribs or splines 78 so that they may be shifted, in the manner hereinafter described, to vary the speed of the vehicle. When the gear wheel 75 is in mesh with the gear wheel 59 the vehicle will be at its first or low speed; when the hub 77 carrying the gear wheels 75, 76 is shifted forwardly on the shaft 74 until the gear wheel 76 passes into mesh with the gear wheel 70, the second speed will be attained, and when the said hub 77 is shifted still farther forwardly or until the gear wheel 76 leaves the gear wheel 70 and the clutch member 79 engages the clutch member 72, high speed or direct drive from the engine will be attained.

The means for shifting the gear wheels 75, 76 and thereby controlling the speed are automatic and mainly contained within the drum 24 and shaft 74. The shaft 74 is hollow throughout a portion of its length and receives a shaft or rod 84 which extends rearwardly into the drum 24 and is formed on opposite sides with reversely inclined gear teeth 85, 86 (Fig. 3). The rod or shaft 84 is incapable of rotation within the shaft 74 but is slidable in said shaft. The shaft 74 is slotted, at 87, and at the slots receives a transverse pin 88 which extends through the hub 77, rod or shaft 84, and slots 87 of the shaft 74, as shown in Fig. 3. The pin 88 is within close-fitting holes in the hub 77 and rod or shaft 84, and hence any sliding movement imparted to the rod or shaft 84 will be communicated to the hub 77 and gear wheels 75, 76 carried thereby.

Figure 5:
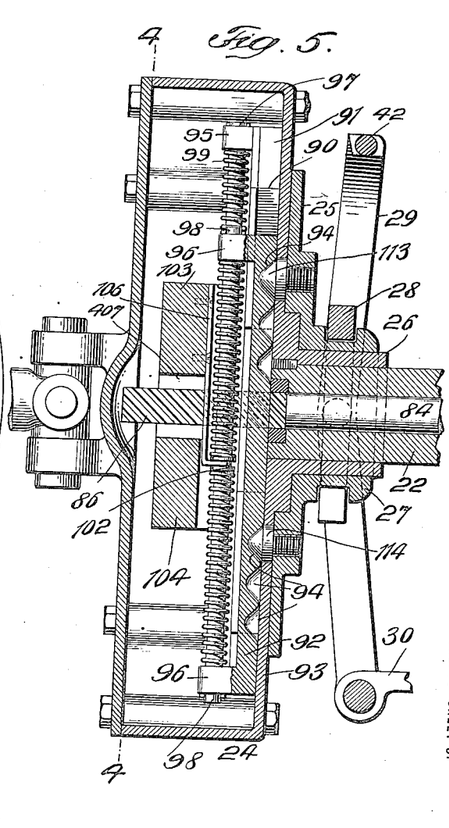
Fig. 5 is a vertical section through the same, taken on the dotted line 5—5 of Fig. 4.

Within the drum 24 and secured to the forward side thereof are four guides, two of which are numbered 89 and two 90. Between the guides 89, 90 and formed to guide thereon, are two slidable bars 91, 92, respectively, formed in their forward faces close against the forward side 93 of the drum 24 with conical, preferably 90°, recesses 94, there being two sets of these recesses, as shown in Fig. 5, one set being at one side of the shaft or rod 84 and the other set at the other side thereof. The bars 91, 92 are formed on their ends with rearwardly extending apertured ears 95, 96, respectively, and with these ears are rods 97, 98, respectively, upon which are confined coiled springs 99, 100, respectively, there being two springs 99 on the rod 97 separated at their adjoining ends by a fixed sleeve 101 and there also being two springs 100 on the rod 98 separated by a fixed sleeve 102. At opposite ends of the sleeves 101, 102 and slidable on the rods 97, 98 are washers 201 and 202, respectively, against which the adjoining ends of said springs 99, 100 respectively normally or initially press.

Figures 6, 7, 8:
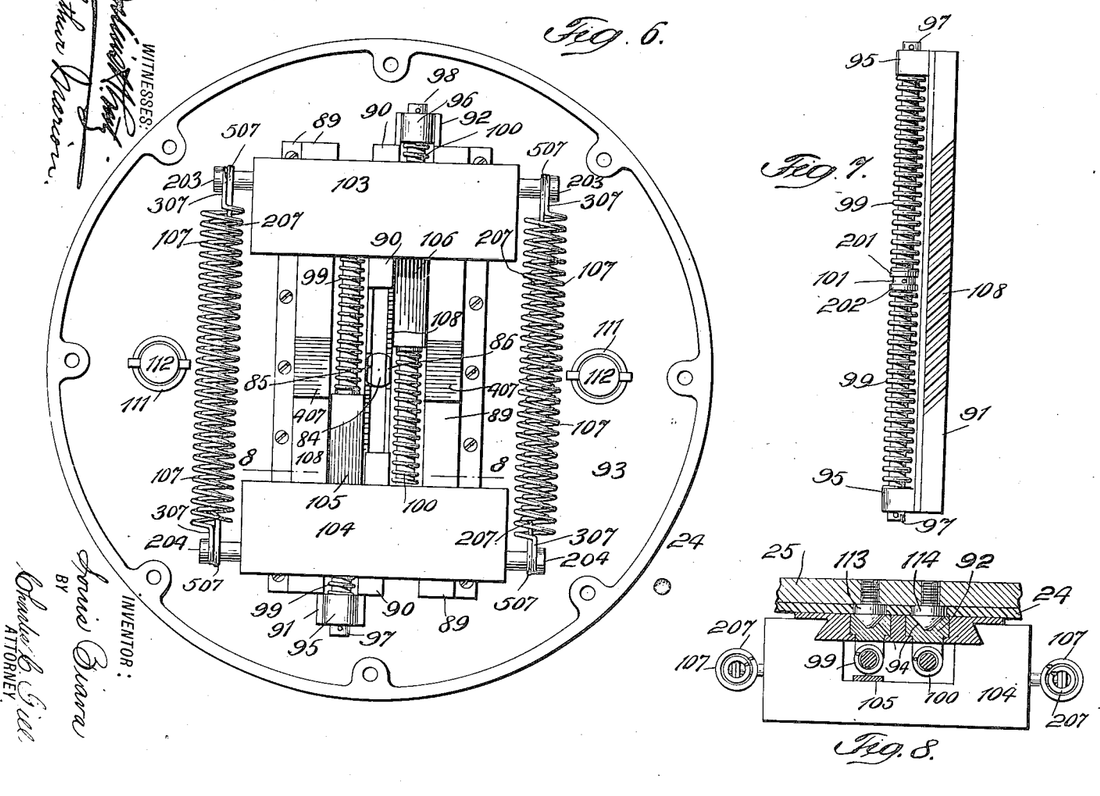
Fig. 6 is a view corresponding with Fig. 4, but illustrating the parts of the mechanism in a different position,—one that takes place automatically due to centrifugal action when the apparatus is in use.
Fig. 7 is a detached edge view of a portion of the mechanism illustrated in Figs. 4, 5 and 6.
Fig. 8 is a horizontal section, taken on the dotted line 8—8 of Fig. 6.
Figure 11:
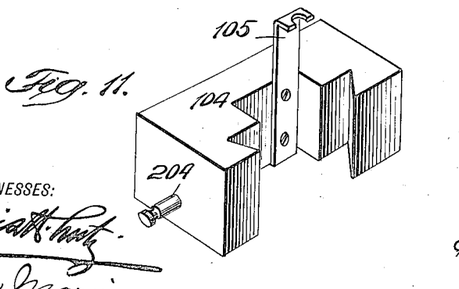
Fig. 11 is a detached perspective view of one of the slidable blocks or weights shown more particularly in Figs. 4, 5, 6 and 8.

Mounted upon the guides 89 at opposite sides of the center of the drum are two weights or metal blocks 103, 104, respectively, one of which is shown in perspective in Fig. 11. The weights 103, 104 are grooved to engage the guides 89, and they are adapted to have a sliding movement on said guides. The weight 104 has secured to it an arm 105 whose upper end is deflected laterally and recessed to partly encompass the sleeve 101 and engage one of the washers (one or the other) 201, 202 on the rod 97; and the weight 103 is provided with a corresponding but reversely extending arm 106 adapted to engage the washers 201, 202 on the rod 98. The weights 103 and 104 are provided with two sets of connecting coiled springs 107, 207, respectively, one preferably being within the other and coming into action at different stages in the operation of the mechanism. The weights 103, 104 are provided with laterally extending pins 203, 204, and the springs 107 have at their ends loops 307 to engage said pins when the weights are at their inner initial relative position kept separated by projecting portions 407 on the guides 89; and the springs 207 have at their ends loops 507 which are longer than the loops 307 and are engaged by the pins 203, 204 on the outward movement of the weights 103, 104 to a predetermined extent requiring an extra load to be placed on them. During the employment of the apparatus the weights 103, 104 are caused by centrifugal force to fly outwardly in a direction from each other and in doing so first stretch the springs 107 and thereafter the springs 107 and 207, as shown in Fig. 6, and at the same time act through the bars 105, 106 against opposite springs 99, 100 carried by the bars 91, 92, the whole being for the purpose hereinafter explained.

The bars 91, 92 have on their facing edges inclined gear teeth 108 (Figs. 6 and 7), the teeth on one bar being inclined oppositely to the teeth on the other bar. The rear end of the rod or shaft 84 is squared off and in its opposite sides formed with inclined gear teeth 85, 86, respectively, which are engaged by the gear teeth 108 on the bars 91, 92. The gear teeth 85, 86 incline reversely to the gear teeth 108 on the aforesaid bars with the result that when the bars are slid under the action of the weights 103, 104 the teeth thereon by engaging the teeth 85, 86, effect a sliding action of the shaft or rod 84 and the shifting of the hub 77 and gear wheels 75, 76. When the shaft 84 is, by means of the intermeshing gear teeth thereon and on the bars 91, 92 and during the outward movement of said bars, under the action of the springs carried thereby and the weights 103, 104, caused to slide forwardly, it will, as will appear obvious from Fig. 3, effect the shifting of the hub 77 so as to disengage the gear-wheel 75 from the gear wheel 59 and move the gear-wheel 76 into mesh with the gear wheel 70, and then on a further forward movement of the shaft 84 during the further outward movement in opposite directions of the bars 91, 92, the gear-wheel 76 will leave the gear-wheel 70 and the clutch member 79 will pass into engagement with the clutch member 72. The movement of the shaft 84 from the bars 91, 92 is therefore for the purpose of modifying or varying the speed at which the vehicle may be driven. On the movement of the bars 91, 92 toward each other, the gear teeth thereon intermeshing with the gear-teeth on the shaft or rod 84 will effect a retraction rearwardly of the said rod or shaft, causing it to act through the hub 77 for modifying the speed in accordance with the position said hub may carry the gear-wheels thereon with relation to the other gear-wheels in the gear-box 21.

The movement of the weights 101, 102 and of the bars 91, 92 for varying the speed from first speed to a higher speed or degree or from a higher speed to some intermediate or first speed is automatic during the movement of the vehicle, but under the control of the operator by means which include the lever 32, rod 36, rod 39, yoke 29 and slidable plate 25, these features having been hereinbefore referred to. The plate 25 engages the forward face of the drum 24 and is normally tightly bound against said face by means of the springs 111 secured on rods 112 connected with said plate 25 and extending into the drum 24, said rods 112 having transverse pins serving as stops for the rear ends of the springs 111, as shown in Fig. 3, and the front ends of said springs having a bearing against tubular bearing sleeves cast integrally with the forward portion of the drum 24. The disk or plate 25 has firmly secured to it conical studs 113 and 114 (Fig. 5), there being two of these studs for each bar 91, 92. The studs 113 and 114 conform to the conical shape of the recesses 94 in the bars 91, 92, as shown in Fig. 5, and said studs are adapted to enter said recesses when the recesses are in position to receive them and the plate or disk 25 is drawn against the face of the drum 24 by means of the springs 111.

Figure 4:
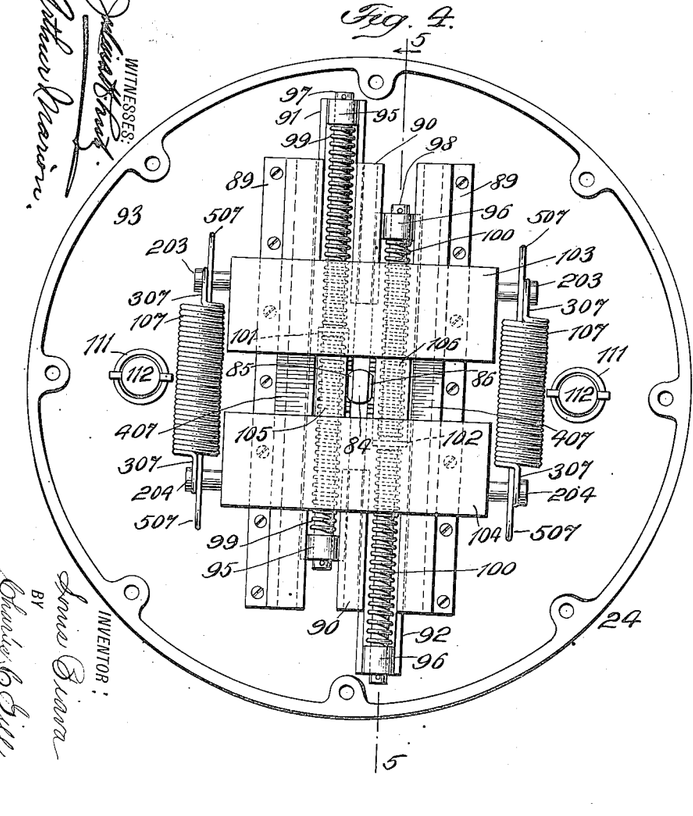
Fig. 4 is a view, taken on the dotted line 4—4 of Fig. 5, of a portion of the mechanism of my invention.

In the position of the parts shown in Figs. 3, 4 and 5, with the gearing set for the first speed, there will be no action of the mechanism within the drum 24, except when the vehicle is set in motion. When the vehicle is set in motion in the ordinary way and is traveling at its first speed, the drum 24 will be rotated from the shafts 18, 74 and the centrifugal action due to the rotation of said drum will cause the weights 103 and 104 to move outwardly on their guides in a direction from each other, said weights at this time, to-wit, under the first speed of the vehicle moving outwardly in a direction from each other in opposition to the force of the springs 107 and until the pins 203, 204 on said weights reach the loops 507 on the springs 207, at which time said weights will become arrested by reason of the additional load imposed on them by said springs 207. During the outward movement of the weights 103 and 104 by centrifugal action during the first speed of the vehicle, said weights effect through their bars or arms 105 and 106 the compression of one spring 99 carried by the bar 91 and the compression of the opposite spring 100 carried by the bar 92, these springs being compressed outwardly in a direction from each other and their compression being caused by the outward pull of the arms 105, 106 against the slidable collars 201, 202, respectively, on the rods 97, 98. The outward movement of the weights 103, 104 and the compression of the aforesaid springs 99, 100 thereby, produce no immediate effect but so set the mechanism that the operator may change from low speed to a higher speed at will, and in accomplishing this result, the operator merely presses with his foot on the treadle 32 until, through the rods 36, 39, he effects through the yoke 29 the forward movement of the plate 25 in a direction from the drum 24 and in opposition to the force of the springs 111. When the plate 25 is thus pulled forwardly, its studs 113, 114 leave the recesses 94, which hold them during the period that the vehicle was traveling on its first speed and immediately thereupon the bars 91, 92 having been placed under the tension of the compressed springs 99, 100 by the weights 103, 104, slide outwardly in a direction reverse to each other a space equal to that between the first recess 94 and the second recess 94 in said bars 91, 92 at opposite sides of the shaft 84, and thereupon the operator will release the foot treadle 32 so that the rods 36, 39 may restore the yoke 29 and plate 25 to their former initial position, thus causing the studs 113 and 114 when reëntering the drum 24 to pass into the recesses 94 then presented to them so as to lock the bars 91, 92 in their new position, to-wit, as having slid in reverse directions a space equal to that between the first recess 94 and the second recess 94 at each side of the shaft 84. The movement of the bars 91, 92 to this second position has the effect through the gear-teeth thereon acting against the gear-teeth 85, 86 on the shaft 84 of shifting said shaft 84 forwardly a distance sufficient for said shaft to disengage the gear-wheel 75 from the gear-wheel 59 and place the gear-wheel 76 in mesh with the gear-wheel 70, thus placing the gearing on an intermediate or second speed, enabling the engine to drive the vehicle at a speed higher than first speed. The movement of the shaft 84 to vary the speed is automatic and is effected by the stored up power of the springs 99, 100 which were compressed by the outward movement of the weights 103, 104. When the bars 91, 92 slide outwardly in reverse directions under the compression of the springs 99, 100 which is when they are released so to slide by the forward movement of the plate 25 retracting the studs 113, 114 therefrom, the springs which were compressed become relaxed and assume their former condition and the weights 103, 104 practically do not change their relation to each other, except as the vehicle traveling under second speed exerts a greater centrifugal action on said weights and causes them to move outwardly in opposition to the combined forces of the springs 107 and 207. During the travel of the vehicle on second speed, the weights 103, 104 will travel outwardly by centrifugal action and stretch both springs 107 and 207, as shown in Fig. 6, thereby again compressing the springs 99, 100 which had previously been compressed and then released and setting the entire mechanism within the drum 24 in condition to act automatically for shifting the gears to high speed when desired.

Should the operator desire to run the vehicle at high speed after said vehicle had been running at second speed, he would simply have to press on the foot treadle 32 and through the rods 36, 39 and yoke 29 draw the plate 25 forwardly for the purpose of withdrawing the studs 113, 114 from the recesses 94 in the bars 91, 92, and this having been done, the compressed springs 99, 100, having been placed under compression by the further outward movement of the weights 103, 104, will cause the said bars 91, 92 to immediately slide outwardly in reverse directions from each other and carry the next one of the series of recesses 94 into the plane of the studs 113, 114, and thereupon the operator will release the foot treadle 32 so that the plate 25 may be returned against the drum 24 and carry its studs 113, 114 into the recesses 94 then presented to them, said studs being thereby enabled to lock the bars 91, 92 in their then new position. The further outward movement of the bars 91, 92 results in the gear-teeth thereon acting against the gear-teeth 85, 86 on the shaft 84, sliding said shaft forwardly until the shaft forces the gear-wheel 76 from the gear-wheel 70 and places the clutch member 79 in engagement with the clutch-member 72, thus placing the mechanism under high speed conditions. The recess 41 at the rear end of the rod 39 serves as a means for pulling or turning the yoke 29 forwardly, and if for any reason the pointed ends of the studs 113 and 114 should not squarely enter the recesses 94 in the bars 91, 92 presented to them, the forward wall of the recess 41 may be utilized as a means through the rods 36, 39 of forcing the yoke 29 rearwardly and driving said studs properly into the appropriate recesses 94. When the vehicle is traveling at high speed, the weights 103, 104 will remain in their outer position and likewise the bars 91, 92 will be locked in their outer position by the studs 113, 114. When the vehicle ceases to be in motion or slows up its motion, the weights 103, 104 will under the force of the springs connecting them retract toward their first or normal position and in doing so release the springs 99, 100 which they had previously compressed and, the bars 91, 92 remaining at that time stationary, the arms 105, 106 on the weights will move against and compress the other opposite springs 99, 100 which had followed with the bars 91, 92 on their movement in a direction outwardly and oppositely to each other. The movement of the weights 103, 104 toward their normal position, compressing the aforesaid springs 99, 100, will place said springs under a tension acting to pull, when they are permitted to do so, the bars 91, 92 to their normal position or to such position as the operator may desire them to have in accordance with the speed he may desire to utilize for the vehicle. When it is desired to change the speed of the vehicle on a downward ratio and the vehicle itself has been slowed down by the manipulation of the engine clutch or otherwise so that the weights 103, 104 have moved inwardly, the operator acting against the foot lever 32 will cause the yoke 29 to draw the plate 25 and studs 113, 114 carried thereby forwardly from the drum 24 and at this time the weights having compressed the said springs 99, 100, said springs will retract the bars 91, 92 inwardly, said bars moving in reverse directions, until the proper recesses 94 in said bars are in position to receive the said studs 113, 114, and thereupon the plate 25 will be returned to its position against the drum 24 and the said studs will enter the recesses alined with them, thus again holding the bars 91, 92 stationary. The outward movements of the weights 103, 104 compress opposite springs 99, 100 so as to store up power in them for moving said bars when the plate 25 is drawn forwardly from the drum 24, and the inward movement of the said weights acting against the other opposite springs 99, 100 store up power in said springs for retracting the bars 91, 92 toward their initial position when it is desired that the vehicle shall have a slower speed or be brought to a stop and the plate 25 is withdrawn forwardly from the drum 24 so as to permit said bars 91, 92 to be retracted under the stored up power of the said springs 99, 100.

I have defined the gear-teeth on the shaft 84 and the gear-teeth on the bars 91, 92, but I do not desire to be limited, in the broader scope of my invention, to any special gear-teeth for effecting the shifting of the rod or shaft 84 on and by the movement of the bars 91, 92.

With respect to the gear-box 21, I have shown just sufficient gearing to illustrate my invention, the gearing shown being capable of utilization for first speed, second speed and high speed and also for reversing, but it is obvious by adding to the gearing, additional degrees of speed may be secured in a manner well known in this art. I present certain novel features in connection with the interior mechanism of the gear-box 21, but the more essential features of my invention reside in the automatic means I have provided for varying the speed, said means being subject however to the control of the operator.

I desire it understood that I do not confine my invention, further than the appended claims may require, to the mechanical details shown as illustrative of one desirable embodiment of my invention, since I am aware that these details may be modified in many particulars without departing from the spirit of my invention.

What I claim as my invention and desire to secure by Letters-Patent, is:

1. In a motor vehicle, in combination, transmission gearing shiftable to vary the speed, a spring motor adapted to be potentially energized by the speed of the vehicle for shifting the gearing to vary the speed, and means under the control of the operator for releasing said motor to act.

2. In a motor vehicle, in combination, transmission gearing shiftable to vary the speed, a spring motor adapted to be actuated to store up power by the speed of the vehicle for shifting the gearing to secure a higher speed, and means for releasing said motor to act.

3. In a motor vehicle, in combination, transmission gearing shiftable to vary the speed, a spring motor adapted to be actuated to store up power by the speed of the vehicle for shifting the gearing to secure a higher speed, a spring motor adapted to be actuated to store up power by the speed of the vehicle for shifting the gearing to secure a lower speed, and means for releasing said motors to act.

4. In a motor vehicle, in combination, transmission gearing shiftable to vary the speed, a rod connected with the movable gear, a normally stationary bar for moving said rod to shift the gear, a spring engaging said bar, means adapted to be actuated by the speed of the vehicle for placing said spring under tension against said bar, and means under the control of the operator for releasing said bar to move said rod under the force of said spring.

5. In a motor vehicle, in combination, transmission gearing shiftable to vary the speed, a rod connected with the movable gear, a normally stationary bar for moving said rod in either direction to shift the gear for a higher speed or a lower speed, opposite springs engaging said bar, means adapted to be actuated by the speed of the vehicle for placing either spring under tension against said bar, and means under the control of the operator for releasing said bar to move said rod under the force of the spring placed under tension.

6. In a motor vehicle, in combination, transmission gearing shiftable to vary the speed, a rod connected with the movable gear, a normally stationary bar geared to and for moving said rod to shift the gear, a spring engaging said bar, means adapted to be actuated by the speed of the vehicle for placing said spring under tension against said bar, and means under the control of the operator for releasing said bar to move said rod under the force of said spring.

7. In a motor vehicle, in combination, transmission gearing shiftable to vary the speed, a rod connected with the movable gear, a normally stationary bar geared to and for moving said rod in either direction to shift the gear for a higher speed or a lower speed, opposite springs engaging said bar, means adapted to be actuated by the speed of the vehicle for placing either spring under tension against said bar, and means under the control of the operator for releasing said bar to move said rod under the force of the spring placed under tension.

8. In a motor vehicle, in combination, transmission gearing shiftable to vary the speed, a rod connected with the movable gear, two normally stationary coacting oppositely movable bars for moving said rod to shift the gear, oppositely disposed springs engaging said bars, means adapted to be actuated by the speed of the vehicle for placing said springs under tension against said bars, and means under the control of the operator for releasing said bars to move said rod under the force of said springs.

9. In a motor vehicle, in combination, transmission gearing shiftable to vary the speed, a rod connected with the movable gear, two normally stationary coacting oppositely movable bars for moving said rod in either direction to shift the gear for a higher speed or a lower speed, oppositely disposed springs engaging each of said bars, means adapted to be actuated by the speed of the vehicle for placing opposing springs of the respective bars under tension against the bars, and means under the control of the operator for releasing said bars to move said rod under the force of the springs placed under tension.

10. In a motor vehicle, in combination, transmission gearing shiftable to vary the speed, a rod connected with the movable gear, two normally stationary coacting oppositely movable bars geared to and for moving said rod to shift the gear, oppositely disposed springs engaging said bars, means adapted to be actuated by the speed of the vehicle for placing said springs under tension against said bars, and means under the control of the operator for releasing said bars to move said rod under the force of said springs.

11. In a motor vehicle, in combination, transmission gearing shiftable to vary the speed, a rod connected with the movable gear, two normally stationary coacting oppositely movable bars geared to and for moving said rod in either direction to shift the gear for a higher speed or a lower speed, oppositely disposed springs engaging each of said bars, means adapted to be actuated by the speed of the vehicle for placing opposing springs of the respective bars under tension against the bars, and means under the control of the operator for releasing said bars to move said rod under the force of the springs placed under tension.

12. In a motor vehicle, in combination, transmission gearing shiftable to vary the speed, a rod connected with the movable gear, a normally stationary bar for moving said rod to shift the gear, a spring engaging said bar, a weight engaging said spring and free to be acted on centrifugally by the speed of the vehicle for placing said spring under tension against said bar, and means under the control of the operator for releasing said bar to move said rod under the force of said spring.

13. In a motor vehicle, in combination, transmission gearing shiftable to vary the speed, a rod connected with the movable gear, a normally stationary bar for moving said rod in either direction to shift the gear for a higher speed or a lower speed, opposite springs engaging said bar, a weight engaging said springs and free to be acted on centrifugally by the speed of the vehicle for placing either spring under tension against said bar, and means under the control of the operator for releasing said bar to move said rod under the force of the spring placed under tension.

14. In a motor vehicle, in combination, transmission gearing shiftable to vary the speed, a rod connected with the movable gear, a normally stationary bar geared to and for moving said rod to shift the gear, a spring engaging said bar, a weight engaging said spring and free to be acted on centrifugally by the speed of the vehicle for placing said spring under tension against said bar, and means under the control of the operator for releasing said bar to move said rod under the force of said spring.

15. In a motor vehicle, in combination, transmission gearing shiftable to vary the speed, a rod connected with the movable gear, a normally stationary bar geared to and for moving said rod in either direction to shift the gear for a higher speed or a lower speed, opposite springs engaging said bar, a weight engaging said springs and free to be acted on centrifugally by the speed of the vehicle for placing either spring under tension against said bar, and means under the control of the operator for releasing said bar to move said rod under the force of the spring placed under tension.

16. In a motor-vehicle, in combination, transmission gearing shiftable to vary the speed, a rod connected with the movable gear, two normally stationary coacting oppositely movable bars for moving said rod to shift the gear, oppositely disposed springs engaging said bars, weights engaging said springs and free to be acted on centrifugally by the speed of the vehicle for placing either spring under tension against its bar and means under control of the operator for releasing said bars to move said rod under the force of said springs.

17. In a motor-vehicle, in combination, transmission gearing shiftable to vary the speed, a rod connected with the movable gear, two normally stationary coacting oppositely movable bars for moving said rod in either direction to shift the gear for a higher speed or a lower speed, oppositely disposed springs engaging each of said bars, weights engaging said springs and free to be acted on centrifugally by the speed of the vehicle for placing either set of springs under tension against said bars and means under the control of the operator for releasing said bars to move said rod under the force of the springs.

18. In a motor vehicle, in combination, transmission gearing shiftable to vary the speed, a rod connected with the movable gear, and having gear teeth on its sides, two normally stationary coacting oppositely movable rack-bars in mesh with the gear-teeth on said rod for moving said rod in either direction to shift the gear for a higher speed or a lower speed, oppositely disposed springs engaging each of said bars, weights engaging said springs and free to be acted on centrifugally by the speed of the vehicle for placing either set of springs under tension against said bars, and means under the control of the operator for releasing said bars to move said rod under the force of said springs.

19. In a motor vehicle, in combination, transmission gearing shiftable to vary the speed, a rod connected with the movable gear, a rotary drum connected with the driving mechanism and containing mechanism for moving said rod to shift said movable gear, comprising a normally stationary bar for moving said rod to shift the gear, a spring engaging said bar, a weight engaging said spring and free to be acted on centrifugally by the speed of the vehicle for placing said spring under tension against said bar, a plate having studs adapted to recesses in said bar for holding said bar normally stationary, and means under the control of the operator for withdrawing said studs from said bar so that said bar under the force of said spring may move said rod to shift the gear.

20. In a motor vehicle, in combination, transmission gearing shiftable to vary the speed, a rod connected with the movable gear, a rotary drum connected with the driving mechanism and containing means for moving said rod comprising a normally stationary bar for moving said rod in either direction to shift the gear for a higher speed or a lower speed, opposite springs engaging said bar, a weight engaging said springs and free to be acted on centrifugally by the speed of the vehicle for placing either spring under tension against said bar, a plate having studs adapted to recesses in said bar for holding said bar normally stationary, and means under the control of the operator for withdrawing said studs from said bar so that the bar under the force of its springs may move said rod to shift the gear.

21. In a motor vehicle, in combination, transmission gearing shiftable to vary the speed, a rod connected with the movable gear, a rotary drum connected with the driving mechanism and containing means for moving said rod comprising a normally stationary bar for moving said rod in either direction to shift the gear for a higher speed or a lower speed, opposite springs engaging said bar, a weight engaging said springs and free to be acted on centrifugally by the speed of the vehicle for placing either spring under tension against said bar, a plate having studs adapted to recesses in said bar for holding said bar normally stationary, and means under the control of the operator for withdrawing said studs from said bar so that the bar under the force of its springs may move said rod to shift the gear, said studs and the recesses in said bar being of conical formation.

22. In a motor vehicle, in combination, transmission gearing shiftable to vary the speed, a rod connected with the movable gear, a rotary drum connected with the driving mechanism and containing means for moving said rod comprising two normally stationary coacting oppositely movable bars for moving said rod to shift the gear, oppositely disposed springs engaging said bars, weights engaging said springs and free to be acted on centrifugally by the speed of the vehicle for placing said springs under tension against said bars, a plate having studs adapted to recesses in said bars for holding said bars normally stationary and means under the control of the operator for withdrawing said studs from said bars so that said bars under the force of said springs may move said rod to shift the gear for a higher speed or a lower speed.

23. In a motor vehicle, in combination, transmission gearing shiftable to vary the speed, a rod connected with the movable gear, a rotary drum connected with the driving mechanism and containing means for moving said rod to shift the gear for a higher speed or a lower speed, comprising two normally stationary coacting oppositely movable bars for shifting said rod in either direction, oppositely disposed springs engaging each of said bars, weights engaging said springs and free to be acted on centrifugally by the speed of the vehicle for placing said springs under tension against said bars, plural springs connecting said weights and adapted to be brought into action in succession for yieldingly resisting the movement of the weights, and means under the control of the operator for releasing said bars to move said rod under the force of the springs placed under tension.

24. In a motor vehicle, in combination, transmission gearing shiftable to vary the speed, a rod connected with the movable gear, a rotary drum connected with the driving mechanism and containing means for moving said rod to shift the gear for a higher speed or a lower speed, comprising two normally stationary coacting oppositely movable bars for shifting said rod in either direction, oppositely disposed springs engaging each of said bars, weights engaging said springs and free to be acted on centrifugally by the speed of the vehicle for placing said springs under tension against said bars, plural springs connecting said weights and adapted to be brought into action in succession for yieldingly resisting the movement of the weights, a plate having studs adapted to recesses in said bars for holding said bars normally stationary, and means under the control of the operator for withdrawing said studs from said bars so that said bars under the force of said springs may move said rod to shift the gear.

25. In a motor vehicle, in combination, transmission gearing shiftable to vary the speed, a rod connected with the movable gear, a rotary drum connected with the driving mechanism and containing means for moving said rod to shift the gear for a higher speed or a lower speed, comprising two normally stationary coacting oppositely movable bars for shifting said rod in either direction, oppositely disposed springs engaging each of said bars, weights engaging said springs and free to be acted on centrifugally by the speed of the vehicle for placing said springs under tension against said bars, plural springs connecting said weights and adapted to be brought into action in succession for yieldingly resisting the movement of the weights, a plate having studs adapted to recesses in said bars for holding said bars normally stationary, and means under the control of the operator for withdrawing said studs from said bars so that said bars under the force of said springs may move said rod to shift the gear, said plate having a strong spring tension against said drum and the means under the control of the operator for moving said plate to withdraw said studs being a hinged yoke frame connected with said plate, a rod engaging said frame and a foot pedal to which said rod is connected.

26. In a motor vehicle, in combination, transmission gearing shiftable to vary the speed and mounted on a driving shaft, a rod slidable in said shaft and connected with the movable gear, a rotary drum connected with the driving mechanism and receiving one end of said rod and containing means for moving said rod to shift the gear comprising two normally stationary coacting oppositely movable bars geared to said rod for moving the same in either direction to shift the gear for a higher speed or a lower speed, oppositely disposed springs engaging each of said bars, weights engaging said springs and free to be acted on centrifugally by the speed of the vehicle for placing either set of springs under tension against said bars, plural springs connecting said weights for resisting their movement and means under the control of the operator for releasing said bars to move said rod under the force of the springs.

27. In a motor vehicle, in combination, transmission gearing shiftable to vary the speed and mounted on the driving shaft, a rod slidable within said shaft and connected with the movable gear, means operable centrifugally by the speed of the vehicle for shifting said rod for a higher speed or a lower speed, and means under the control of the operator for releasing said power means to act.

28. In a motor vehicle, in combination, transmission gearing comprising shiftable gears mounted on a driving shaft, a second shaft through which power may be transmitted to said driving shaft and having gears to engage the shiftable gears on the driving shaft and one of which is shiftable for reversing, gearing to be engaged by said shiftable gear wheel for effecting the reversal of the drive, manually operative means for shifting said gear-wheel, and means for shifting the gearing on the driving shaft for varying the speed to a higher speed or a lower speed, said manually operative means comprising a rock-bar or shaft carrying a segment, a hand lever for operating said bar or shaft, and a rack engaged by said segment and connected with said gear-wheel, combined with means for automatically yieldingly securing said rack in its several positions.

Signed at New York city, in the county of New York and State of New York, this 28th day of August A. D. 1915.

LOUIS BIAVA.

Witnesses:
ARTHUR MARION,
CHAS. C. GILL.